United States Patent
Kadyan et al.

(10) Patent No.: US 12,425,863 B2
(45) Date of Patent: Sep. 23, 2025

(54) METHODS, SYSTEMS, AND COMPUTER READABLE MEDIA FOR DETECTING AND MITIGATING SECURITY ATTACKS ON PRODUCER NETWORK FUNCTIONS (NFs) USING ERROR RESPONSE MESSAGES

(71) Applicant: Oracle International Corporation, Redwood Shores, CA (US)

(72) Inventors: Sonia Kadyan, New Delhi (IN); Jay Rajput, Bangalore (IN); John Nirmal Mohan Raj, Bangalore (IN); Ashish Jyoti Sharma, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 128 days.

(21) Appl. No.: 18/523,322

(22) Filed: Nov. 29, 2023

(65) Prior Publication Data
US 2025/0175800 A1    May 29, 2025

(51) Int. Cl.
*H04W 12/122* (2021.01)
*H04W 12/06* (2021.01)
*H04W 12/088* (2021.01)

(52) U.S. Cl.
CPC ......... *H04W 12/122* (2021.01); *H04W 12/06* (2013.01); *H04W 12/088* (2021.01)

(58) Field of Classification Search
CPC .. H04W 12/122; H04W 12/088; H04W 12/06
See application file for complete search history.

(56) References Cited

U.S. PATENT DOCUMENTS 10,778,527 B2 * 9/2020 Assali ............... H04L 67/101
11,483,741 B2   10/2022 Nair et al.
(Continued)

FOREIGN PATENT DOCUMENTS

| CN | 112003912 B | 11/2021 |
| EP | 4 152 691 A1 | 3/2023 |
| WO | WO 2025/117125 A1 | 6/2025 |

OTHER PUBLICATIONS

3rd Generation Partnership Project; Technical Specification Group Core Network and Terminals; 5G System; Technical Realization of Service Based Architecture; Stage 3 (Release 18) 3GPP TS 29.500 V18.4.0 pp. 1-149 (Dec. 2023).
(Continued)

*Primary Examiner* — Brian F Shaw
(74) *Attorney, Agent, or Firm* — Jenkins, Taylor & Hunt, P.A.

(57) ABSTRACT

A method for detecting and mitigating security attacks on producer NFs using error response messages includes tracking, by a proxy NF, rates of error response messages generated in response to inter-PLMN SBI request messages from consumer NFs. The method further includes receiving an inter-PLMN SBI request message, obtaining information for identifying a consumer NF and a producer NF from the inter-PLMN SBI request message, and determining that a rate of error response messages generated in response to inter-PLMN SBI request messages from the consumer NF to the producer NF exceeds a threshold rate. The method further includes, in response to determining that the rate of error response messages generated in response to SBI request messages from the consumer NF exceeds the threshold rate, performing a network security action.

20 Claims, 9 Drawing Sheets

(56) References Cited

U.S. PATENT DOCUMENTS

| | | | |
|---|---|---|---|
| 11,533,358 | B1 | 12/2022 | Khare et al. |
| 11,553,342 | B2 | 1/2023 | Mahalank et al. |
| 11,825,310 | B2 | 11/2023 | Rajput et al. |
| 2020/0036754 | A1 | 1/2020 | Livanos |
| 2022/0070648 | A1* | 3/2022 | Krishan ............ H04W 8/005 |
| 2022/0353263 | A1 | 11/2022 | Choyi et al. |
| 2023/0199497 | A1 | 6/2023 | Krishan et al. |
| 2023/0284008 | A1 | 9/2023 | Muhanna et al. |
| 2025/0175491 | A1 | 5/2025 | Mohan Raj et al. |
| 2025/0175801 | A1 | 5/2025 | Kadyan et al. |
| 2025/0234187 | A1 | 7/2025 | Mohan Raj et al. |

OTHER PUBLICATIONS

3rd Generation Partnership Project; Technical Specification Group Core Network and Terminals; 5G System; Network Function Repository Services; Stage 3 (Release 18) 3GPP TS 29.510 V18.5.0, pp. 1-382 (Dec. 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.5.0 pp. 1-130 (Dec. 2023).

3rd Generation Partnership Project; Technical Specification Group Services and System Aspects; Security architecture and procedures for the 5G System; Stage 2 (Release 18) 3GPP TS 33.501 V18.4.0 pp. 1-326 (Dec. 2023).

Keller et al., "Roaming in the 5G System: the 5GS roaming architecture," Ericsson Technology Review Articles (Jun. 17, 2021).

5G Roaming Guidelines, Official Document NG. 113—GSM Association Version 2.0, pp. 1-36 (May 28, 2020).

Content for TS 33.501 Word version: 18.4.0, pp. 1-8 (Downloaded Jan. 31, 2024) https://www.tech-invite.com/3m33/toc/tinv-3gpp-33-501_e.html.

Commonly-Assigned, co-pending U.S. Appl. No. 18/414,455 for "Methods, Systems, and Computer Readable Media for Detecting and Processing Inter-Public Land Mobile Network (PLMN) Service-Based Interface (SBI) Messages Without 3GPP-SBI-Originating-Network-ID Headers" (Unpublished, filed Jan. 16, 2024).

Commonly-Assigned, co-pending U.S. Appl. No. 18/523,487 for "Methods, Systems, and Computer Readable Media for Detecting and Mitigating Security Attacks on Producer Network Functions (NFs) Using Mappings Between Dynamically Assigned Service-Based Interface (SBI) Message Identifiers and Proxy NF Identifiers at Proxy NF" (Unpublished, filed Nov. 29, 2023).

Commonly-Assigned, co-pending U.S. Appl. No. 18/523,425 for "Methods, Systems, and Computer Readable Media for Detecting and Mitigating Security Attacks on Producer Network Functions (NFs) Using Access Token to Non-Access-Token Parameter Correlation at Proxy NF" (Unpublished, filed Nov. 29, 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.4.0 pp. 1-116 (Sep. 2023).

Commonly-Assigned, co-pending U.S. Appl. No. 18/608,071 for "Methods, Systems, and Computer Readable Media for Filtering Inter-Public Land Mobile Network (PLMN) Messages at Security Edge Protection Proxy (SEPP) to Implement Roaming Agreements" (Unpublished, filed Mar. 18, 2024).

"3rd Generation Partnership Project; Technical Specification Group Services and System Aspects; System architecture for the 5G System (5GS); Stage 2 (Release 18)" 3GPP TS 23.501, V18.3.0, pp. 1-696 (Sep. 2023).

"3rd Generation Partnership Project; Technical Specification Group Services and System Aspects; Procedures for the 5G System (5GS); Stage 2 (Release 18)" 3GPP TS 23.502, V18.3.0, pp. 1-899 (Sep. 2023).

"3rd Generation Partnership Project; Technical Specification Group Core Network and Terminals; 5G System; Technical Realization of Service Based Architecture; Stage 3 (Release 18)" 3GPP TS 29.500, V18.3.0, pp. 1-148 (Sep. 2023).

"3rd Generation Partnership Project; Technical Specification Group Core Network and Terminals; 5G System; Session Management Services; Stage 3 (Release 18)" 3GPP TS 29.502, V18.4.0, pp. 1-355 (Sep. 2023).

"3rd Generation Partnership Project; Technical Specification Group Core Network and Terminals; 5G System; Network Function Repository Services; Stage 3 (Release 18)" 3GPP TS 29.510, V18.4.0, pp. 1-373 (Sep. 2023).

"3rd Generation Partnership Project; Technical Specification Group Services and System Aspects; Security architecture and procedures for 5G System (Release 18)" 3GPP TS 33.501, V18.3.0, pp. 1-322 (Sep. 2023).

3rd Generation Partnership Project; Technical Specification Group Services and System Aspects; Security architecture and pocedures, 3GPP Draft; 33501-HA0, 3rd Generation Partnership Project (3GPP) Jun. 22, 2023.

Notification of Transmittal of the International Search Report and the Written Opinion of the International Searching Authority, or the Declaration for International Patent Application Serial No. PCT/US2024/053761 (Feb. 4, 2025).

* cited by examiner

METHODS, SYSTEMS, AND COMPUTER READABLE MEDIA FOR DETECTING AND MITIGATING SECURITY ATTACKS ON PRODUCER NETWORK FUNCTIONS (NFs) USING ERROR RESPONSE MESSAGES

TECHNICAL FIELD

The subject matter described herein relates to mitigating security attacks in communications networks. More particularly, the subject matter described herein relates to methods, systems, and computer readable media for detecting and mitigating security attacks on producer NFs using error response messages.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and other types of networks is that inter-public land mobile network (PLMN) service-based interface (SBI) request messages from trusted networks can be intentionally malformed by a hacker to elicit error responses from a producer NF and cause the producer NF to become unavailable. For example, a consumer NF in a trusted network can be compromised by malware code and forced to send malformed or otherwise erroneous SBI request messages to another network. Because the inter-PLMN SBI request messages originate from a trusted network, the receiving network allows the SBI request messages to be forwarded to the producer NF. The producer NF processes the messages, detects errors in the messages, and sends error response messages to the message originator(s). Using such a procedure, a hacker can generate a volume of attack messages that causes the producer NF to be unavailable to process legitimate inter-PLMN SBI request messages. The attempt to overwhelm the resources of a computing entity is referred to as a denial of service (DoS) attack.

Accordingly, in light of these and other difficulties, there exists a need for improved methods, systems, and computer readable media for screening inter-PLMN SBI request messages to mitigate DoS attacks.

SUMMARY

A method for detecting and mitigating security attacks on producer network functions (NFs) using error response messages includes tracking, by a proxy NF, rates of error response messages generated in response to inter-public land mobile network (PLMN) service-based interface (SBI) request messages from consumer NFs. The method further includes receiving, by the proxy NF, an inter-PLMN SBI request message. The method further includes obtaining, by the proxy NF, information for identifying a consumer NF and a producer NF from the inter-PLMN SBI request message. The method further includes determining, by the proxy NF, using the information identifying the consumer NF and the producer NF, and from the tracked rates of error response messages, that a rate of error response messages generated in response to inter-PLMN SBI request messages from the consumer NF exceeds a threshold rate. The method further includes, in response to determining that the rate of error response messages generated in response to SBI request messages from the consumer NF exceeds the threshold rate, performing a network security action.

According to another aspect of the subject matter described herein, tracking rates of error response messages includes maintaining, for each combination of consumer NF and producer NF, a count of error response messages received by the proxy NF within a configurable time period.

According to another aspect of the subject matter described herein, maintaining the counts of error response messages includes maintaining counts of 4xx or 5xx error response messages.

According to another aspect of the subject matter described herein, obtaining the information identifying the consumer NF and the producer NF includes obtaining the information identifying the consumer NF and the information identifying the producer NF from an OAuth 2.0 access token claim transmitted with the inter-PLMN SBI request message.

According to another aspect of the subject matter described herein, obtaining the information identifying the consumer NF and the producer NF includes obtaining the information identifying the consumer NF from an OAuth 2.0 access token claim or a User-Agent header transmitted with the inter-PLMN SBI request message and obtaining the information identifying the producer NF from a 3gpp-Sbi-Target-apiRoot header transmitted with the inter-PLMN SBI request message.

According to another aspect of the subject matter described herein, performing the network security action includes blocking the SBI request message.

According to another aspect of the subject matter described herein, performing the network security action includes marking the consumer NF as suspect and blocking or throttling SBI request messages from the consumer NF or a network of the consumer NF for a configurable time period.

According to another aspect of the subject matter described herein, performing the network security action includes transmitting a fake error response generated by the proxy NF in response to the inter-PLMN SBI request message.

According to another aspect of the subject matter described herein, the proxy NF comprises a security edge protection proxy (SEPP).

According to another aspect of the subject matter described herein, the proxy NF comprises a service communication proxy (SCP).

According to another aspect of the subject matter described herein, a system for detecting and mitigating security attacks on producer network functions (NFs) using error response messages is provided. The system includes a proxy NF including at least one processor and a memory. The system further includes an inter-public land mobile network (PLMN) service-based interface (SBI) request security controller implemented by the at least one processor for tracking rates of error response messages generated in response to inter-PLMN SBI request messages from consumer NFs, receiving an inter-PLMN SBI request message, obtaining information for identifying a consumer NF and a producer NF from the inter-PLMN SBI request message, determining, using the information identifying the consumer NF and the producer NF and from the tracked rates of error response messages, that a rate of error response messages generated in response to inter-PLMN SBI request messages from the consumer NF to the producer NF exceeds a threshold rate, and, in response to determining that the rate of error response messages generated in response to SBI request messages from the consumer NF exceeds the threshold rate, performing a network security action.

According to another aspect of the subject matter described herein, the inter-PLMN SBI request security controller is configured to track rates of error response messages by maintaining, for each combination of consumer NF and producer NF, a count of error response messages received by the proxy NF within a configurable time period.

According to another aspect of the subject matter described herein, the counts of error response messages include counts of 4xx or 5xx error response messages.

According to another aspect of the subject matter described herein, the inter-PLMN SBI request security controller is configured to obtain the information identifying the consumer NF and the producer NF from an OAuth 2.0 access token claim transmitted with the inter-PLMN SBI request message.

According to another aspect of the subject matter described herein, the inter-PLMN SBI request security controller is configured to obtain the information identifying the consumer from an OAuth 2.0 access token claim transmitted with the inter-PLMN SBI request message and the information from a 3gpp-Sbi-Target-apiRoot header transmitted with the inter-PLMN SBI request message.

According to another aspect of the subject matter described herein, the network security action includes blocking the SBI request message.

According to another aspect of the subject matter described herein, the network security action includes marking the consumer NF as suspect and blocking or throttling SBI request messages from the consumer NF or a network of the consumer NF for a configurable time period.

According to another aspect of the subject matter described herein, the network security action includes transmitting a fake error response generated by the proxy NF in response to the inter-PLMN SBI request message.

According to another aspect of the subject matter described herein, the proxy NF comprises a security edge protection proxy (SEPP) or a service communication proxy (SCP).

According to another aspect of the subject matter described herein, A non-transitory computer readable medium having stored thereon executable instructions that when executed by a processor of a computer control the computer to perform steps is provided. The steps include tracking, by a proxy NF, rates of error response messages generated in response to inter-public land mobile network (PLMN) service-based interface (SBI) request messages from consumer NFs. The steps further include receiving, by the proxy NF, an inter-PLMN SBI request message. The steps further include obtaining, by the proxy NF, information for identifying a consumer NF and a producer NF from the inter-PLMN SBI request message. The steps further include determining, by the proxy NF, using the information identifying the consumer NF and the producer NF, and from the tracked rates of error response messages, that a rate of error response messages generated in response to inter-PLMN SBI request messages from the consumer NF to the producer NF exceeds a threshold rate. The steps further include in response to determining that the rate of error response messages generated in response to SBI request messages from the consumer NF to the producer NF exceeds the threshold rate, performing, by the proxy NF, a network security action.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
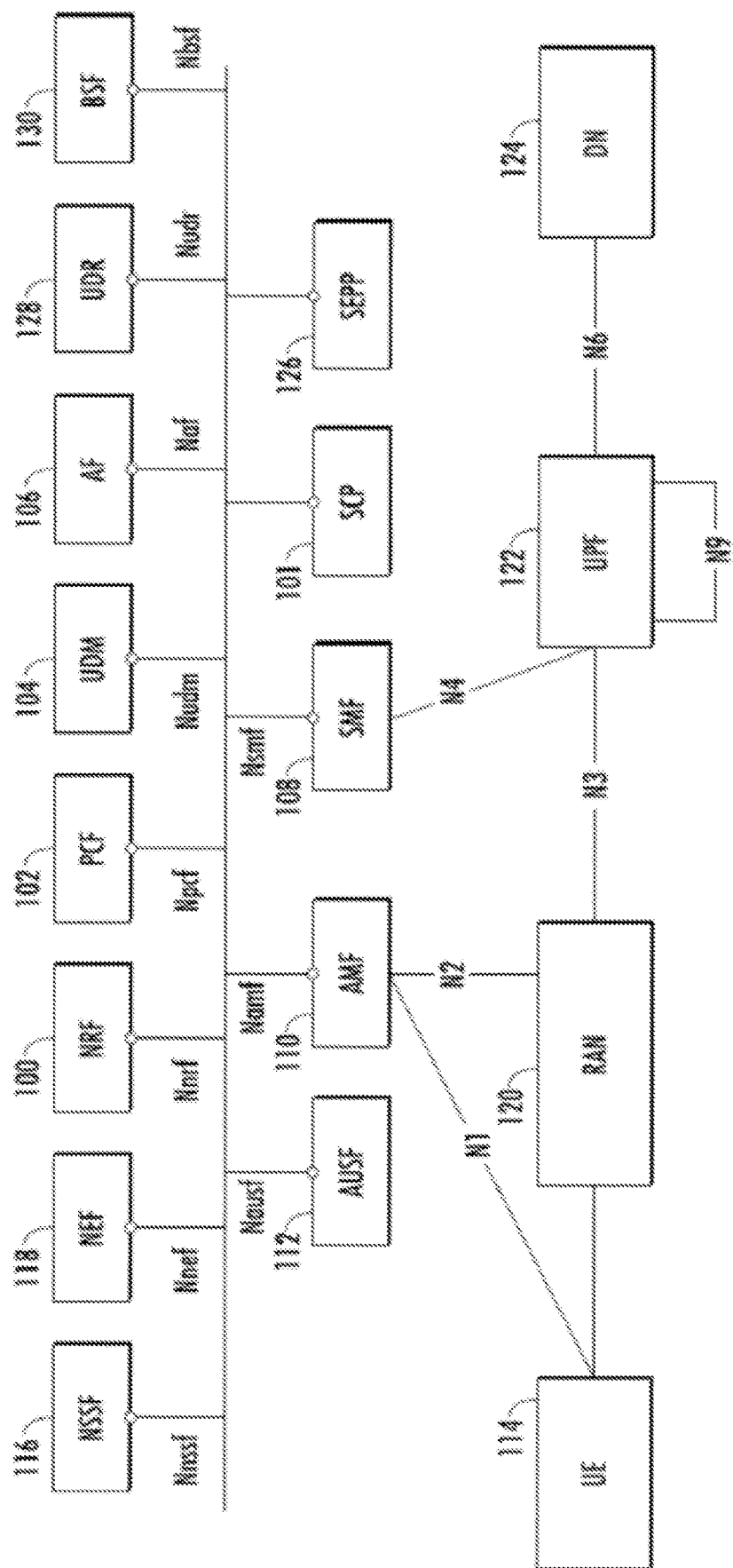
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
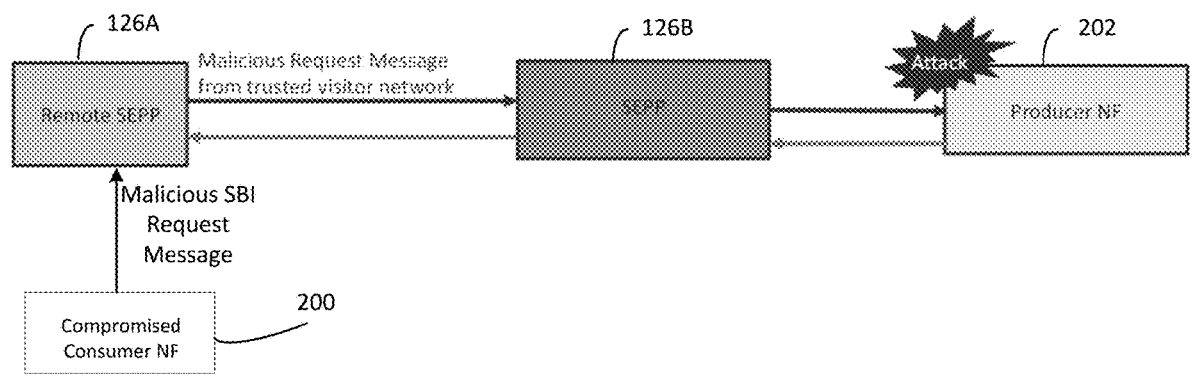
FIG. 2 is a network diagram illustrating the transmission of a malicious inter-PLMN SBI request message from a trusted visitor network to a producer NF.

As described above, one problem that can occur in 5G and other types of networks is that inter-PLMN SBI request messages from trusted networks can be used for DoS attacks on producer NFs. FIG. 2 is a network diagram illustrating the transmission of a malicious inter-PLMN SBI request message from a trusted visitor network to a producer NF located in the home network. Referring to FIG. 2, a compromised consumer NF 200 originates a malicious SBI request message and forwards the request to SEPP 126A. SEPP 126A forwards the SBI request message to SEPP 126B. SEPP 126B determines that the SBI request message originates from a trusted network and forwards the SBI request message to producer NF 202. The SBI request message is malformed, so producer NF 202 generates an error response message and forwards the error response message to SEPP 126B. SEPP 126B forwards the error response message to SEPP 126A. SEPP 126A forwards the error response message to consumer NF 200.

One problem with the scenario illustrated in FIG. 2 is that SEPP 126A allows the malicious SBI request messages into the network because the SBI request messages originate from a trusted network. If compromised consumer NF 200 generates a sufficient volume of malformed SBI request messages directed to producer NF 202, consumer NF 200 can overwhelm the processing resources of producer NF 202.

Figure 3:
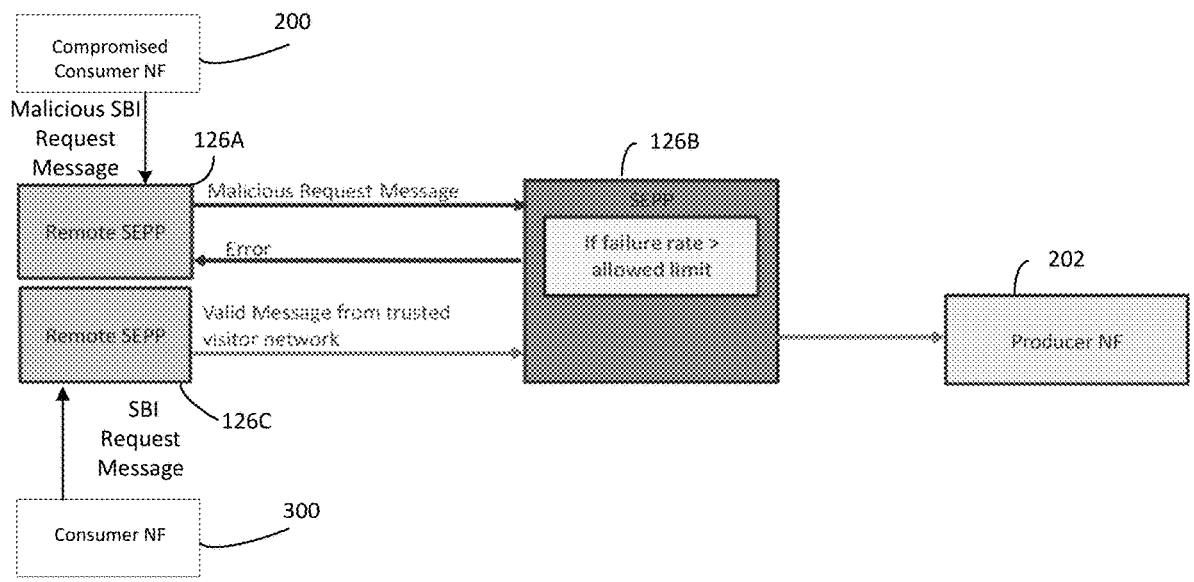
FIG. 3 is a diagram illustrating the use of error response messages at the SEPP to mitigate or reduce the likelihood of forwarding of malicious inter-PLMN request messages to a producer NF in a network protected by the SEPP.

To address the problem illustrated in FIG. 2, a proxy NF, such as an SEPP or SCP, may use error response messages, specifically error response message rates, to prevent forwarding of malicious inter-PLMN request messages to a producer NF. FIG. 3 is a network diagram illustrating the use of error response messages in rejecting malicious inter-PLMN SBI request messages. Referring to FIG. 3, compromised consumer NF 200 generates a malicious SBI request message and forwards the malicious SBI request message to remote SEPP 126A. Remote SEPP 126A forwards the malicious SBI request message to SEPP 126B. SEPP 126B tracks the rate of error response messages generated in response to SBI request messages from consumer NF 200 to producer NF 202. As will be described in more detail below, SEPP 126B may maintain counts of error response messages generated in response to SBI request messages from consumer NFs to producer NFs and update the counts each time a new error response message is received. SEPP 126B may monitor the counts within a sliding window time period such that the error count represents a current rate of error response messages from a particular consumer NF to a particular producer NF.

In FIG. 3, it is assumed that at the time the malicious SBI request message from consumer NF 200 is received by SEPP 126B, the count of error response messages based on previous requests from consumer NF 200 to producer NF 202 exceeds the limit. Accordingly, SEPP 126B, in this example, generates an error response message on behalf of producer NF 202 and blocks or prevents the forwarding of the malicious SBI request message to producer NF 202. The error response message sent from SEPP 126 may be a fake error response message that appears as if it came from a producer NF, using a real or pseudo-identity of the producer NF.

Consumer NF 300 generates an SBI request message and forwards the SBI request message to remote SEPP 126C. Remote SEPP 126C forwards the SBI request message to SEPP 126B. SEPP 126B determines that the current rate of error response messages generated in response to SBI request messages from consumer NF 300 to producer NF 202 does not exceed the threshold. Accordingly, SEPP 126B forwards the SBI request message to producer NF 202. By tracking error response rates for each combination of producer NFs and consumer NFs and using the tracked rates to mitigate security attacks, the subject matter described herein provides for fine grained detection and mitigation of security attacks.

Figure 4:
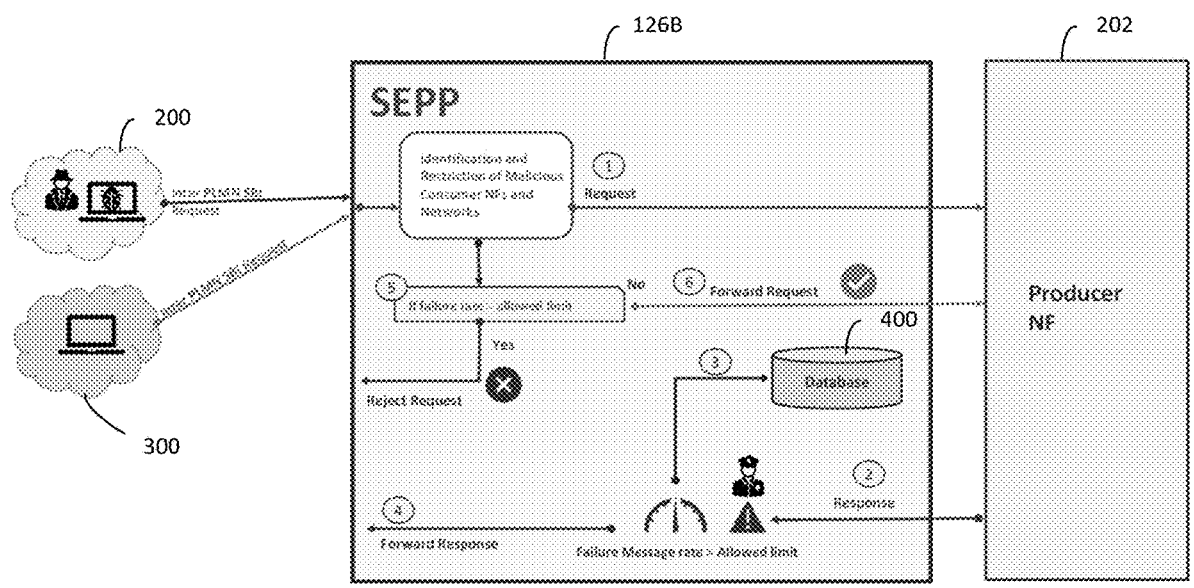
FIG. 4 is a diagram illustrating exemplary processing within the SEPP that uses error response message rates to mitigate or reduce the likelihood of forwarding of malicious inter-PLMN SBI request messages to a producer NF.

FIG. 4 is a diagram illustrating exemplary processing within the SEPP that uses error response message rates to mitigate the forwarding of malicious inter-PLMN SBI request messages to a producer NF. Referring to FIG. 4, SEPP 126B receives SBI request messages from consumer NFs 200 and 300. In step 1, SEPP 126B determines that a first SBI request from consumer NF 200 is to be allowed to proceed to producer NF 202 because the current error response message rate tracked for messages from consumer NF 200 to producer NF 202 does not exceed the threshold. In step 2, SEPP 126B receives an error response message from producer NF 202. In step 3, SEPP 126B updates the count of error response messages received from consumer NF 200 to producer NF 202 in an error response tracking database 400 and determines that the error rate now exceeds the limit. In step 4, SEPP 126B forwards the error response message to consumer NF 200.

When SEPP 126B receives another SBI request message from consumer NF 200 to producer NF 202, SEPP 126B determines, in step 5, that the error response rate for messages from consumer NF 200 to producer NF 202 exceeds the limit and blocks the request. When SEPP 126B receives SBI request messages from consumer NF 300 for which the error response message rate is not exceeded, SEPP 126B forwards the SBI request messages to producer NF 202, as indicated by step 6.

Figure 5:
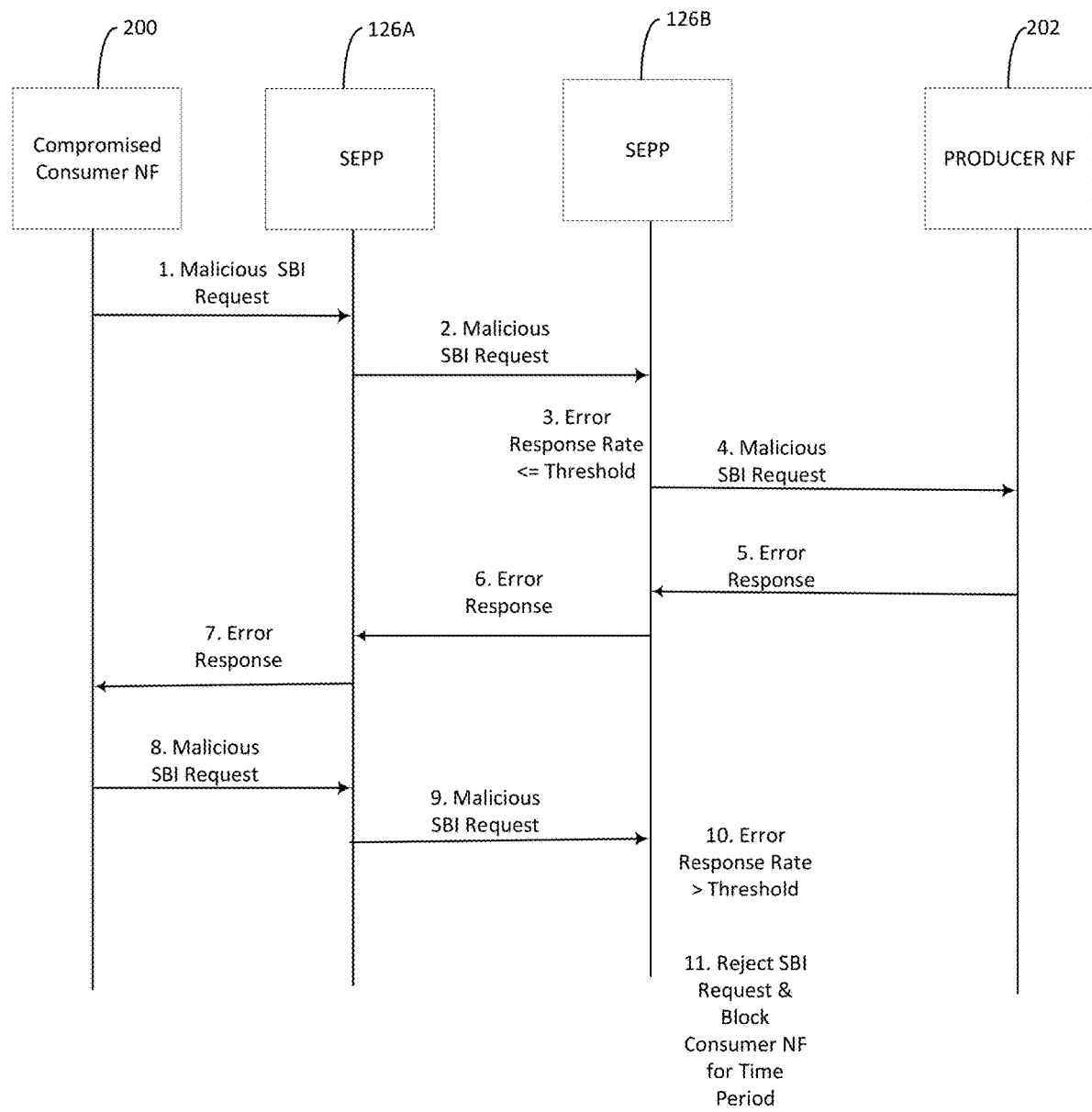
FIG. 5 is a message flow diagram illustrating exemplary messages exchanged in a network where the SEPP uses error response message rates to mitigate or reduce the likelihood of forwarding of inter-PLMN SBI request messages to a producer NF in the network protected by the SEPP.

FIG. 5 is a message flow diagram illustrating exemplary messages exchanged in a network where the SEPP uses error response message rates to mitigate or reduce the likelihood of forwarding of inter-PLMN SBI request messages to a producer NF in the network protected by the SEPP. Referring to FIG. 5, in step 1, compromised consumer NF 200 sends a malicious SBI request to producer NF 202 via SEPP 126A. In step 2, SEPP 126A forwards the request to SEPP 126B. In step 3, SEPP 126B receives the SBI request and determines that the current error response rate for SBI requests from consumer NF 200 to producer NF 202 is less than or equal to the limit or threshold value, and, in step 4, forwards the SBI request to producer NF 202. SEPP 126B may make this determination by accessing error response tracking database 400 illustrated in FIG. 4 and locating or creating an entry to track error responses from consumer NF 200 to producer NF 202. Table 1 shown below is an example of data that may be included in the error response tracking database.

TABLE 1

Example Error Response Data Tracked by SEPP

| Consumer NF ID | Producer NF ID | Error Response Count | Error Response Timestamps | Error Response Rate Limit |
|---|---|---|---|---|
| AMF1 | UDR1 | 10 | 0700:00 0700:10 0700:18 | 10/min |

Table 1: Example Error Response Data Tracked by SEPP
In Table 1, the entry for tracking error responses generated in response to SBI requests from consumer NF 200 to producer NF 202 may include consumer NF identifying information, producer NF identifying information, an error response count, timestamps of receipt of the error responses, and an operator-configured limit. SEPP 126B may obtain the consumer NF ID from an OAuth 2.0 access token claim, which is required to be included in SBI request messages. SEPP 126B may also obtain the producer NF ID from an OAuth 2.0 access token claim of the SBI request. SEPP 126B may alternatively obtain the producer NF ID from a 3gpp-Sbi-TargetApiRoot header of the SBI request message. The error response count may be a running count of the number of error response messages received within a configured time period before the current time. To maintain the error response count, SEPP 126B may increment the error response count each time an error response from producer NF 202 to consumer NF 200 is received and store a timestamp indicating time of receipt of the error response. SEPP 126B may identify a consumer NF through information in the User-Agent header or one of the access token claims of an ingress SBI request. SEPP 126B may identify producer NF 202 based on information in the 3gpp-Sbi-Target-apiRoot header of the SBI request. SEPP 126B may identify the error response as being to consumer NF 200 through information that SEPP 126B has inferred based on the ingress SBI request. For example, SEPP 126B may maintain context information associated with a request and may receive and process responses within the same context.

The context information associated with a request may be maintained at the sockets level for the connections between SEPPs 126A and 126B and between SEPP 126B and producer NF 202. SEPP 126B may identify the error response as being from producer NF 202 by reading producer NF identification information from the problem details or from a 3gpp-Sbi-Binding header of the error response message.

SEPP 126B may decrement the error response count each time a timestamp of one of the previously-received error responses falls outside of a moving or sliding time window, which has a width that is equal to a predetermined time interval before the current time. Thus, the error response count is a running count of the number of error responses received within an operator-configured time period. Thus, the term "rate of error response messages" includes a count of messages received within a time period and/or a rate calculated by dividing the number of error response messages received by the time period. SEPP 126B determines whether the rate is greater than the threshold rate or rate limit value. The threshold rate or rate limit value may be a rate, as indicated by the example in Table 1 or a count for a given time period, which implies a rate. If the rate exceeds the threshold, SEPP 126B may perform network security actions for the present request and for subsequent requests matching the entry in the database.

Returning to FIG. 5, in step 5, producer NF 202 sends an error response message to SEPP 126B. SEPP 126B locates the entry in database 400 corresponding to error response messages generated for SBI requests from consumer NF 200 to producer NF 202 and increments the error response message count. In step 6, SEPP 126B forwards the error response to SEPP 126A. Using the data in Table 1 as an example, the error response count may be updated from 10 to 11, which causes the error response count to exceed the limit. In step 7, SEPP 126A forwards the response to consumer NF 200.

In step 8, consumer NF 200 sends an SBI request to SEPP 126A. In step 9, SEPP 126A forwards the SBI request to SEPP 126B. In step 10, SEPP 126B reads the consumer and producer NF identifying information from the SBI request, accesses the corresponding entry in the error response tracking database, and determines that the current error rate exceeds the threshold. Accordingly, in step 11, SEPP 126B performs a network security action. In this example, the network security action includes rejecting the request and blocking messages from the consumer NF for a configurable time period.

Figure 6:
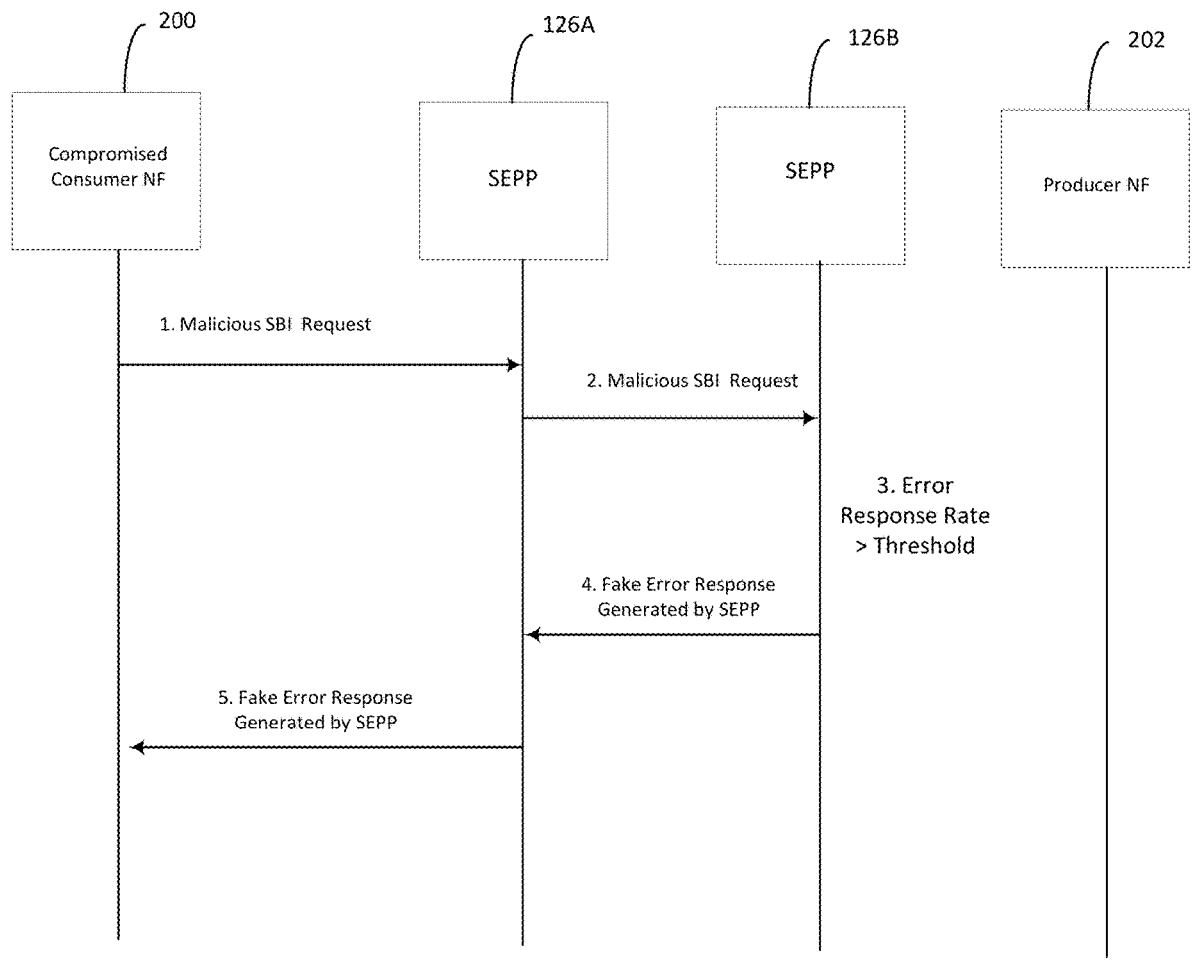
FIG. 6 is a message flow diagram illustrating an example where the SEPP determines that the error response rate tracked for error responses generated in response to inter-PLMN SBI requests from a consumer NF is greater than a threshold and generates a fake error response on behalf of the producer NF in the network protected by the SEPP.

Another network security action that can be performed in addition to those illustrated in FIG. 5 is to generate fake error response messages on behalf of the producer NF. FIG. 6 is a message flow diagram illustrating an example where the SEPP determines that the error response rate tracked for a consumer NF is greater than a threshold and generates a fake error response on behalf of the producer NF in the network protected by the SEPP. Referring to FIG. 6, in step 1, consumer NF 200 sends an SBI request to SEPP 126A. In step 2, SEPP 126A forwards the SBI request to SEPP 126B. In step 3, SEPP 126B reads the consumer and producer NF identifying information from the SBI request, accesses the corresponding entry in the error response tracking database, and determines that the current error response count exceeds the threshold. Accordingly, in step 4, SEPP 126B performs a network security action. In this example, the network security action transmitting a fake error response message on behalf of producer NF 202 without forwarding the SBI request to producer NF 202. The fake error response message may be a type of message expected for the request, e.g., a 4xx or 5xx error response message, which appears to originate from a producer NF. Having the SEPP generate fake error response messages when the error response rate is exceeded is advantageous because the processing resources of producer NF 202 are further conserved, and the originator of the malicious SBI request messages mistakenly believes that the malicious SBI request messages are consuming the processing resources of a producer NF.

Figure 7:
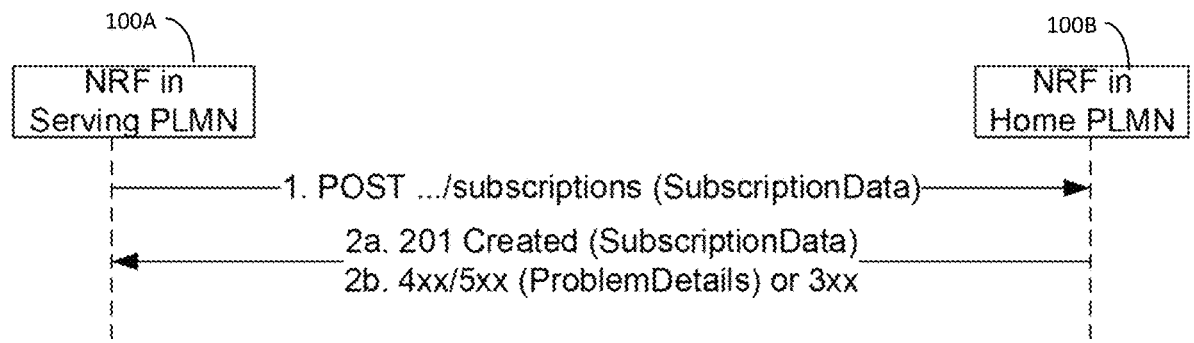
FIG. 7 is an example of an inter-PLMN SBI request and corresponding success and error response messages that can be generated by the home NRF acting as a producer NF.

An example of inter-PLMN SBI request and error response messages that may be transmitted in a network will now be described. FIG. 7 is an example of an inter-PLMN SBI request and corresponding success and error response messages that can be generated by the home NRF acting as a producer NF. In FIG. 7, in step 1, an NRF 100A in a serving PLMN forwards a subscription request to a home NRF 100B. In step 2a, if home NRF 100B can successfully create the subscription, home NRF 100B sends a 201 Created message with subscription data. If home NRF 100B cannot successfully create the subscription (e.g., because the request is malformed or malicious), home NRF 100B responds as indicated in step 2b with a 4xx or 5xx message indicating problem details. The 4xx or 5xx message illustrated in FIG. 7 is the type of error response message that is counted by SEPP 126B to determine whether to perform a network security action in response to a received SBI request message. The problem details in the 4xx or 5xx message may include the nf instance ID or other identifying information of the sender of the message, which may be used by SEPP 126B to track the error responses from a producer NF to a consumer NF. The 3gpp-Sbi-Binding header of the error response message may also include information identifying the sender of the message. The consumer NF identifying information may be obtained from the error response message using information that SEPP 126B inferred from the SBI request message.

Figure 8:
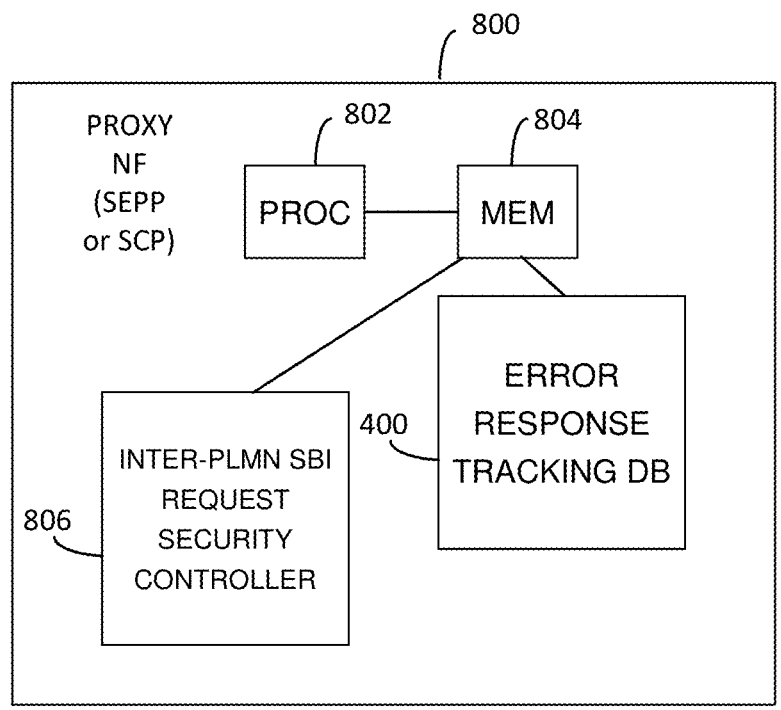
FIG. 8 is a block diagram illustrating an exemplary architecture of a proxy NF for using error response messages to mitigate denial of service attacks.

As stated above, error response tracking and attack mitigation can be performed at a proxy NF, such as an SEPP or an SCP. FIG. 8 is a block diagram illustrating an exemplary architecture of a proxy NF for using error response messages to mitigate denial of service attacks. Referring to FIG. 8, proxy NF 800 may be an SCP or an SEPP that includes at least one processor 802 and memory 804. Proxy NF 800 further includes an inter-PLMN SBI request security controller 806 for detecting DoS attacks based on error response messages and mitigating the attacks. Proxy NF 800 further includes error response tracking database 400 that stores, on a per-consumer-NF and per-producer-NF basis, error response message counts generated by the producer NFs in response to SBI request messages from the consumer NFs. Inter-PLMN SBI request security controller 806 may be implemented using computer executable instructions stored in memory 804 and executed by processor 802.

Figure 9:
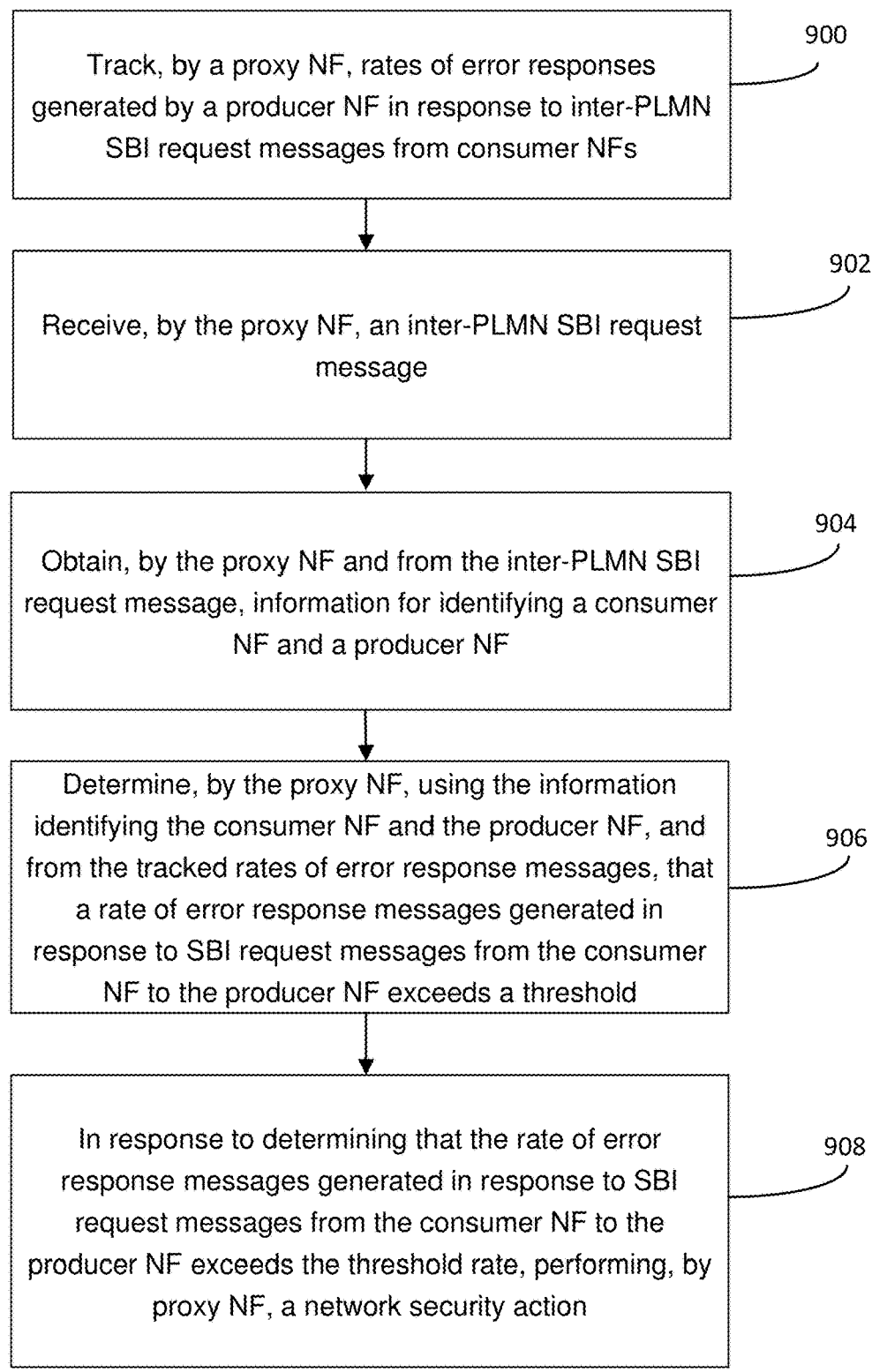
FIG. 9 is a flow chart illustrating an exemplary process for mitigating denial of service attacks using error response messages.

FIG. 9 is a flow chart illustrating an exemplary process for mitigating denial of service attacks using error response messages. Referring to FIG. 9, in step 900, the process includes tracking, at a proxy NF, rates of error responses generated by a producer NF in response to inter-PLMN SBI request messages from consumer NFs. For example, inter-PLMN SBI request security controller 806 of proxy NF 800 may track, in database 400, rates of error response messages generated by producer NFs in the network of proxy NF 800 in response to inter-PLMN SBI request messages from consumer NFs, where the consumer NFs can be non-malicious consumer NFs, consumer NFs compromised with attack code, or hackers masquerading as consumer NFs.

In step 902, the process further includes receiving, by the proxy NF, an inter-PLMN SBI request message. For example, inter-PLMN SBI request security controller 806 of proxy NF 800 may receive an SBI request message from an SEPP in another PLMN. The message may originate from a non-malicious consumer NF, a compromised consumer NF, or a hacker masquerading as a consumer NF.

In step 904, the process further includes obtaining, by the proxy NF and from the inter-PLMN SBI request message, information for identifying a consumer NF and a producer NF. For example, inter-PLMN SBI request security controller 806 of proxy NF 800 may obtain consumer NF identifying information from the User-Agent header or one of the OAuth 2.0 access token claims of the inter-PLMN SBI request and may obtain producer NF identifying information from one of the OAuth 2.0 access token claims or the 3gpp-Sbi-Target-apiRoot header of the inter-PLMN SBI request. It is understood that "information identifying the consumer NF" may refer to information identifying a non-malicious consumer NF, a compromised consumer NF, or a hacker masquerading as a consumer NF.

In step 906, the process further includes determining, by the proxy NF, using the information identifying the consumer NF and the producer NF, and from the tracked rates of error response messages, that a rate of error response messages generated in response to SBI request messages from the consumer NF to the producer NF exceeds a threshold rate. For example, inter-PLMN SBI request security controller 806 of proxy NF 800 may access an entry in error response tracking database 400 using consumer NF and producer NF identifying information from a received inter-PLMN SBI request message, read the current error response rate from the entry, and determine that the error response rate exceeds the configured error response rate limit or threshold.

In step 908, the process further includes, in response to determining that the rate of error response messages generated in response to SBI request messages from the consumer NF to the producer NF exceeds the threshold rate, performing a network security action. For example, inter-PLMN SBI request security controller 806 of proxy NF 800 may block the inter-PLMN SBI request message, block, throttle or limit subsequent messages from the consumer NF, generate a fake error response message on behalf of the producer NF, and/or alert a network operator of the attack. Messages to be throttled, blocked, or limited can be identified based on consumer NF, consumer SEPP, or producer service API.

Exemplary advantages of the subject matter described herein include the ability to prevent or mitigate security/DoS attacks initiated from allowed locations (serving networks). By preventing or mitigating the attacks, the solution described herein protects the processing and other resources of producer NFs, which can cause the producer NFs to fail in unexpected ways.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.4.0 (2023-09)
2. 3$^{rd}$ Generation Partnership Project; Technical Specification Group Services and System Aspects; System architecture for the 5G System; Stage 2 (Release 18) 3GPP TS 23.501 V18.3.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting and mitigating security attacks on producer network functions (NFs) using error response messages, the method comprising:
   tracking, by a proxy NF, rates of error response messages generated in response to inter-public land mobile network (PLMN) service-based interface (SBI) request messages from consumer NFs;
   receiving, by the proxy NF, an inter-PLMN SBI request message;
   obtaining, by the proxy NF, information for identifying a consumer NF and a producer NF from the inter-PLMN SBI request message;
   determining, by the proxy NF, using the information identifying the consumer NF and the producer NF, and from the tracked rates of error response messages, that a rate of error response messages generated in response to inter-PLMN SBI request messages from the consumer NF to the producer NF exceeds a threshold rate; and
   in response to determining that the rate of error response messages generated in response to SBI request messages from the consumer NF to the producer NF exceeds the threshold rate, performing, by the proxy NF, a network security action.

2. The method of claim 1 wherein tracking rates of error response messages includes maintaining, for each combination of consumer NF and producer NF, a count of error response messages received by the proxy NF within a configurable time period.

3. The method of claim 2 wherein maintaining the counts of error response messages includes maintaining counts of 4xx or 5xx error response messages.

4. The method of claim 1 wherein obtaining the information identifying the consumer NF and the producer NF includes obtaining the information identifying the consumer NF and the information identifying the producer NF from an OAuth 2.0 access token claim transmitted with the inter-PLMN SBI request message.

5. The method of claim 1 wherein obtaining the information identifying the consumer NF and the producer NF includes obtaining the information identifying the consumer NF from an OAuth 2.0 access token claim or a User-Agent header transmitted with the inter-PLMN SBI request message and obtaining the information identifying the producer NF from a 3gpp-Sbi-Target-apiRoot header transmitted with the inter-PLMN SBI request message.

6. The method of claim 1 wherein performing the network security action includes blocking the SBI request message.

7. The method of claim 1 wherein performing the network security action includes marking the consumer NF as suspect and blocking or throttling SBI request messages from the consumer NF or a network of the consumer NF for a configurable time period.

8. The method of claim 1 wherein performing the network security action includes transmitting a fake error response generated by the proxy NF in response to the inter-PLMN SBI request message.

9. The method of claim 1 wherein the proxy NF comprises a security edge protection proxy (SEPP).

10. The method of claim 1 wherein the proxy NF comprises a service communication proxy (SCP).

11. A system for detecting and mitigating security attacks on producer network functions (NFs) using error response messages, the system comprising:
   a proxy NF including at least one processor and a memory; and
   an inter-public land mobile network (PLMN) service-based interface (SBI) request security controller implemented by the at least one processor for tracking rates of error response messages generated in response to inter-PLMN SBI request messages from consumer NFs, receiving an inter-PLMN SBI request message, obtaining information for identifying a consumer NF and a producer NF from the inter-PLMN SBI request message, determining, using the information identifying the consumer NF and the producer NF and from the tracked rates of error response messages, that a rate of error response messages generated in response to inter-PLMN SBI request messages from the consumer NF to the producer NF exceeds a threshold rate, and, in response to determining that the rate of error response messages generated in response to SBI request messages from the consumer NF exceeds the threshold rate, performing a network security action.

12. The system of claim 11 wherein the inter-PLMN SBI request security controller is configured to track rates of error response messages by maintaining, for each combination of consumer NF and producer NF, a count of error response messages received by the proxy NF within a configurable time period.

13. The system of claim 12 wherein the counts of error response messages include counts of 4xx or 5xx error response messages.

14. The system of claim 11 wherein the inter-PLMN SBI request security controller is configured to obtain the information identifying the consumer NF and the producer NF from an OAuth 2.0 access token claim transmitted with the inter-PLMN SBI request message.

15. The system of claim 11 wherein the inter-PLMN SBI request security controller is configured to obtain the information identifying the consumer from an OAuth 2.0 access token claim transmitted with the inter-PLMN SBI request message or a User-Agent header and the information from a 3gpp-Sbi-Target-apiRoot header transmitted with the inter-PLMN SBI request message.

16. The system of claim 11 wherein the network security action includes blocking the SBI request message.

17. The system of claim 11 wherein the network security action includes marking the consumer NF as suspect and blocking or throttling SBI request messages from the consumer NF or a network of the consumer NF for a configurable time period.

18. The system of claim 11 wherein the network security action includes transmitting a fake error response generated by the proxy NF in response to the inter-PLMN SBI request message.

19. The system of claim 11 wherein the proxy NF comprises a security edge protection proxy (SEPP) or a service communication proxy (SCP).

20. A non-transitory computer readable medium having stored thereon executable instructions that when executed by a processor of a computer control the computer to perform steps comprising:
   tracking, by a proxy NF, rates of error response messages generated in response to inter-public land mobile network (PLMN) service-based interface (SBI) request messages from consumer NFs;
   receiving, by the proxy NF, an inter-PLMN SBI request message;
   obtaining, by the proxy NF, information for identifying a consumer NF and a producer NF from the inter-PLMN SBI request message;
   determining, by the proxy NF, using the information identifying the consumer NF and the producer NF, and from the tracked rates of error response messages, that a rate of error response messages generated in response to inter-PLMN SBI request messages from the consumer NF to the producer NF exceeds a threshold rate; and
   in response to determining that the rate of error response messages generated in response to SBI request messages from the consumer NF to the producer NF exceeds the threshold rate, performing, by the proxy NF, a network security action.

* * * * *